United States Patent [19]

Wideman et al.

[11] Patent Number: 5,300,585
[45] Date of Patent: Apr. 5, 1994

[54] METHYLOL MODIFIED BISMALEIMIDES FOR RUBBER COMPOSITION

[75] Inventors: Lawson G. Wideman, Tallmadge; Richard M. D'Sidocky, Ravenna, both of Ohio

[73] Assignee: The Goodyear Tire & Rubber Company, Akron, Ohio

[21] Appl. No.: 37,160

[22] Filed: Mar. 25, 1993

[51] Int. Cl.$^5$ .............................. C08C 19/20
[52] U.S. Cl. ..................... 525/332.7; 525/331.1; 525/331.7; 525/347
[58] Field of Search .............. 525/136, 137, 141, 157, 525/158, 161, 164, 331.1, 331.7, 332.7, 347

[56] References Cited

U.S. PATENT DOCUMENTS

| | | | |
|---|---|---|---|
| 4,803,250 | 2/1989 | Nagasaki et al. | 525/329.3 |
| 4,818,601 | 4/1989 | Itoh et al. | 428/297 |
| 4,935,297 | 6/1990 | Yotsumoto | 428/288 |
| 5,153,248 | 10/1992 | Muse | 524/105 |
| 5,194,513 | 3/1993 | Wideman | 525/329.3 |

Primary Examiner—Christopher Henderson
Attorney, Agent, or Firm—Bruce J. Hendricks

[57] ABSTRACT

The present invention relates to methylol modified bismaleimides which are prepared by reacting under condensation conditions an aldehyde and a bismaleimide compound wherein the aldehyde is selected from the group consisting of formaldehyde, acetaldehyde or mixtures thereof; and
said bismaleimide compound is of the formula:

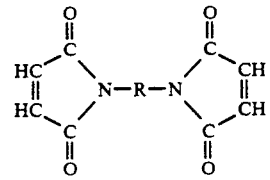

wherein R is a divalent radical selected from the group consisting of an acyclic aliphatic group, a cyclic aliphatic group, an aromatic group, and one to three alkylaromatic groups and wherein these groups may contain a hetero atom selected from O, N and S.

14 Claims, No Drawings

METHYLOL MODIFIED BISMALEIMIDES FOR RUBBER COMPOSITION

BACKGROUND OF THE INVENTION

Various bismaleimides, such as N,N'-(m-phenylene)-bismaleimide, have been added to rubber to modify its properties. For example, in U.S. Pat. No. 4,803,250 various bismaleimides are added to rubber in combination with sulfur and accelerators to improve the resistance to reversion in the vulcanization step. Whereas, bismaleimides can be used to improve reversion resistance, the present inventors have discovered that a new and useful modified form of such bismaleimides are superior in improving the tear resistance of rubber. Since many rubber products are subjected to a harsh environment in use, any improvement in the tear resistance of such rubbers further contributes to the longevity and structural integrity of products made therefrom, including tire treads.

SUMMARY OF THE INVENTION

The present invention relates to a composition comprising a methylol modified bismaleimide compound that is prepared by reacting a bismaleimide with an aldehyde under condensation reaction conditions.

DETAILED DESCRIPTION OF THE INVENTION

There is disclosed a composition which, when added to a diene containing rubber, improves the tear resistant properties. The composition is a methylol modified bismaleimide which is derived from an aldehyde selected from the group consisting of formaldehyde, acetaldehyde or mixtures thereof; and said bismaleimide compound is of the formula:

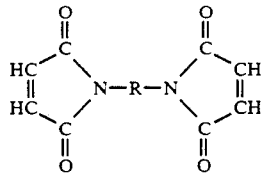

wherein R is a divalent radical selected from the group consisting of an acyclic aliphatic group, a cyclic aliphatic group, an aromatic group, and one to three alkylaromatic groups, and wherein these groups may contain a hetero atom selected from O, N and S.

There is also disclosed a process for improving the tear resistance of a diene containing rubber comprising admixing a rubber selected from the group consisting of natural rubber, homopolymers of conjugated diolefins, copolymers of conjugated diolefins and ethylenically unsaturated monomers or mixtures thereof with the methylol modified bismaleimide of the present invention.

The methylol modified bismaleimide of the present invention is prepared by reacting an aldehyde selected from the group consisting of formaldehyde, acetaldehyde or mixtures thereof with a bismaleimide compound. The formaldehyde may be free formaldehyde, for example, paraformaldehyde. In the alternative, the source of the formaldehyde may be an aqueous solution, such as a 37 percent by weight aqueous solution known as formalin.

Specific bismaleimides which may be used to react with the aldehyde include N,N'-ethylenebismaleimide, N,N'-hexamethylenebismaleimide, N,N'-dodecamethylenebismaleimide, N,N'-(2,2,4-trimethylhexamethylene)bismaleimide, N,N'-(oxydipropylene)bismaleimide, N,N'-(aminodipropylene)bismaleimide, N,N'-(ethylenedioxydipropylene)bismaleimide, N,N'-(1,4-cyclohexylene)bismaleimide, N,N'-(1,3-cyclohexylene)bismaleimide, N,N'-(methylene-1,4-dicyclohexylene)bismaleimide, N,N'-(isopropylidene-1,4-dicyclohexylene)bismaleimide, N,N'-(oxy-1,4-dicyclohexylene)bismaleimide, N,N'-(m-phenylene)bismaleimide, N,N'-(p-phenylene)bismaleimide, N,N'-(o-phenylene)bismaleimide, N,N'-(1,3-naphthylene)bismaleimide, N,N'-(1,4-naphthylene)bismaleimide, N,N'-(1,5-naphthylene)bismaleimide, N,N'-(3,3'-dimethyl-4,4'-biphenylene)bismaleimide, N,N'-(3,3'-dichloro-4,4'-biphenylene)bismaleimide, N,N'-(2,4-pyridyl)bismaleimide, N,N'-(2,6-pyridyl)bismaleimide, N,N'-(4-methyl-2,6-pyridyl)bismaleimide, N,N'-(1,4-anthraquinonediyl)bismaleimide, N,N'-(m-tolylene)bismaleimide, N,N'-(p-tolylene)bismaleimide, N,N'-(4,6-dimethyl-1,3-phenylene)bismaleimide, N,N'-(2,3-dimethyl-1,4-phenylene)bismaleimide, N,N'-(4,6-dichloro-1,3-phenylene)bismaleimide, N,N'-(5-chloro-1,3-phenylene)bismaleimide, N,N'-(5-hydroxy-1,3-phenylene)bismaleimide, N,N'-(5-methoxy-1,3-phenylene)bismaleimide, N,N'-(m-xylylene)bismaleimide, N,N'-(p-xylylene)bismaleimide, N,N'-(methylenedi-p-phenylene)bismaleimide, N,N'-(isopropylidenedi-p-phenylene)bismaleimide, N,N'-(oxydi-p-phenylene)bismaleimide, N,N'-(thiodi-p-phenylene)bismaleimide, N,N'-(dithiodi-p-phenylene)bismaleimide, N,N'-(sulfodi-p-phenylene)bismaleimide, N,N'-(carbonyldi-p-phenylene)bismaleimide, and N,N'-[α,α-bis -(4-maleimidophenyl)-para-diisopropylbenzene].

The preferred bismaleimides for reaction with the aldehyde are N,N'-(m-phenylene)bismaleimide, N,N'-(p-phenylene)bismaleimide and N,N'-(o-phenylene)bismaleimide.

The aldehyde is reacted with the bismaleimide compound under suitable conditions conducive to a condensation reaction. The reaction product may consist of a number of modified bismaleimide compounds, all of which may vary in molecular weight. The molecular weight of the components of the reaction product obviously will vary depending on the bismaleimide compound that is selected, particular aldehyde, ratio of reactants, catalyst, amount of catalyst, temperature of the reaction and reaction time. The molecular weight of the composition of the present invention may very greatly. Generally speaking, the molecular weight may range from about 298 to about 700.

The mole ratio of aldehyde to bismaleimide compound may range from about 0.5:10 to 10:0.5. Preferably, the mole ratio ranges from about 1:1 to 4:1. The condensation reaction is generally conducted in the presence of a catalyst to speed up the reaction. Examples of catalysts that may be used include base catalysts, such as aqueous solutions of sodium carbonate, sodium hydroxide, potassium hydroxide, calcium oxide, calcium hydroxide, sodium carbonate, potassium carbonate and the like. Preferably, sodium hydroxide is used. The amount of catalyst that may be used will vary depending on the particular catalyst that is selected. For example, the base catalyst should range from about 1 to about 20 grams per mole of aldehyde. Preferably, from about 6 to about 9 grams of base catalyst is used per mole of aldehyde.

The condensation reaction may be conducted over wide temperatures. The condensation reaction is an exotherm reaction and may be conducted at a temperature ranging from about moderate to an elevated temperature. In general, the condensation reaction may be conducted at a temperature of from about 5° C. to about 150° C. Preferably, the condensation reaction is conducted at a temperature ranging from about 100° C. to about 125° C.

An aqueous solvent should be used to disperse or suspend the bismaleimide compound for subsequent reaction with the aldehyde. Additional solvents may also be employed so long as they are compatible with the aqueous solvent under the conditions of the reaction and not interfere with the condensation reaction. The condensation reaction may be conducted under a variety of pressures, atmospheric pressure is preferred.

The condensation reaction is conducted for a period of time sufficient to produce the desired condensation product. In general, the condensation reaction time may vary from minutes to several hours. If the more sluggish reaction conditions are selected, the reaction time will have to be extended until the desired product is produced. It is appreciated that the residence time of the reactants will be influenced by the reaction temperature, concentration and choice of reactants, catalyst and the amount of catalyst. Desirably, the condensation reaction is conducted until at least one molar equivalent of aldehyde attaches to one mole of bismaleimide.

Upon completion of the condensation reaction, the reaction mixture should be cooled and the solid product isolated from the mixture. Conventional means of isolation such as suction filtering can be used.

The methylol modified bismaleimides of the present invention may be used with a number of sulfur vulcanizable elastomers. The term "sulfur vulcanizable elastomers or rubber" as used herein embraces both natural and all its various low and reclaim forms as well as various synthetic rubbers. Representative synthetic polymers are the homopolymerization products of butadiene and its homologues and derivatives, as for example, methylbutadiene, dimethylbutadiene and pentadiene as well as copolymers such as those formed from butadiene or its homologues or derivatives with other unsaturated organic compounds. Among the latter are acetylene e.g. vinyl acetylene; olefins, for example, isobutylene, which copolymerizes with isoprene to form butyl rubber; vinyl compounds, for example vinylchloride, acrylic acid, acrylonitrile (which polymerize with butadiene to form NBR), methacrylic acid and styrene, the latter compound polymerizing with butadiene to form SBR as well as vinyl esters and various unsaturated aldehydes, ketones and ethers, e.g., acrolein, methyl isopropenyl ketone and vinylethyl ether. Also included are the various synthetic rubbers prepared by the homopolymerization of isoprene and the copolymerization of isoprene with other diolefins and various unsaturated organic compounds. Also included are the synthetic rubbers such as 1,4-cis polybutadiene and 1,4-cis polyisoprene and similar synthetic rubbers such as EPDM. The preferred rubbers for use with the methylol modified bismaleimides are natural rubber, polybutadiene, butyl rubber, EPDM, butadiene-styrene-isoprene copolymers, butadiene-styrene copolymers and 1,4-cis-polyisoprene.

The methylol modified bismaleimide of the present invention may be compounded in either productive (containing cure package including as sulfur) or nonproductive stock. Incorporation of the methylol modified bismaleimide into the polymer may be accomplished by conventional means of mixing such as by the use of Banburys, Brabenders, etc.

The methylol modified bismaleimide of the present invention may be used in a wide variety of proportions in the above polymers. The methylol modified bismaleimide may be substituted, in whole or in part, for conventional bismaleimides. Generally, the level that may be added to polymer compositions may range from about 0.25 to about 5.0 parts per hundred parts of polymer. Preferably, the amount ranges from about 0.50 to about 3.5 parts per hundred polymer.

The rubber compositions containing the methylol modified bismaleimide find utility in, for example, tires, motor mounts, rubber bushings, power belts, printing rolls, rubber shoe heels and soles, rubber floor tiles, caster wheels, elastomer seals and gaskets, conveyor belt covers, wringers, hard rubber battery cases, automobile floor mats, mud flaps for trucks, ball mill liners, and the like. Preferably, the rubber compositions containing the methylol modified bismaleimides are used in tire applications including for use in treads, sidewalls, apex and chafers.

In addition to the methylol modified bismaleimides of the present invention, other rubber additives may also be incorporated in the rubber. The additives commonly used in rubber vulcanizates are, for example, carbon black, tackifier resins, processing aids, antidegradants, fatty acids, activators, waxes oils and peptizing agents.

By class, representative of the conventional antioxidants and antiozonants (commonly classified together as antidegradants) which may be used include monophenols, bisphenols, thiobisphenols, thioalkylphenols, polyphenols, hydroquinone derivatives, phosphates, thioesters, naphthylamines, diphenylamines and other diarylamine derivatives, para-phenylenediamines and quinolines.

As known to those skilled in the art, depending on the intended use of the sulfur vulcanizable material, certain additives mentioned above are commonly used in conventional amounts. Typical additions of carbon black comprise about 20 to 100 parts by weight of diene rubber (phr), which for many tire applications is generally from about 40 to 70 phr. Typical amounts of tackifier resins comprise about 2 to 10 phr. Typical amounts of processing aids comprise about 1 to 8 phr. Typical amounts of antioxidants comprise 1 to about 5 phr. Typical amounts of antiozonants comprise 1 to about 5 phr. Typical amounts of fatty acids such as stearic acid, oleic acid and the like comprise from about 1 to about 2 phr. Typical amounts of zinc oxide comprise 3 to 5 phr. Typical amounts of waxes comprise 1 to 5 phr. Typical amounts of processing oils comprise 5 to 50 phr. Typical amounts of peptizers comprise 0.1 to 1 phr.

The vulcanization of the rubber containing the methylol modified bismaleimide is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to 8 phr with a range of from 1.0 to 3.0 being preferred.

Accelerators are generally used in rubber compositions to control the time and/or temperature required for vulcanization and to improve the properties of the vulcanizate. In some cases, a single accelerator system is used, i.e., primary accelerator. Conventionally, a primary accelerator is used in amounts ranging from about 0.5 to 2.0 phr. In many other cases, combinations of two or more accelerators are used which may consist of a primary accelerator which is generally used in the larger amount (0.5 to 2.0 phr), and a secondary accelerator which is generally used in smaller amounts (0.05–0.50 phr) in order to activate and to improve the properties of the vulcanizate. Combinations of these accelerators have been known to produce a synergistic effect of the final properties and are somewhat better than those produced by use of either accelerator alone. In addition, delayed action accelerators may be used which are not affected by normal processing temperatures but produce satisfactory cures at ordinary vulcanization temperatures. Suitable types of accelerators that may be used include amines, disulfides, guanidines, thioureas, thiazoles, thiurams, sulfenamides, dithiocarbamates and xanthates. Preferably, the primary accelerator is a sulfenamide. If a secondary accelerator is used, the secondary accelerator is preferably a guanidine, dithiocarbamate or thiuram compound.

The rubber compositions containing the methylol modified bismaleimides may contain a methylene donor. The term "methylene donor" is intended to mean a compound capable of reacting with the methylol modified bismaleimide and generate a resin in-situ. Examples of methylene donors which are suitable for use in the present invention include hexamethylene tetramine, hexaethoxymethylmelamine, hexamethoxymethylmelamine, lauryloxymethylpyridinium chloride, ethoxymethylpyridinium chloride, trioxan hexamethoxymethylmelamine, the hydroxyl groups of which may be esterified or partly esterified, and polymers of formaldehyde such as paraformaldehyde. In addition, the methylene donors may be N-substituted oxymethylmelamines, of the general formula:

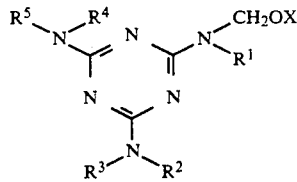

wherein X is an alkyl having from 1 to 8 carbon atoms, $R^1$, $R^2$, $R^3$, $R^4$ and $R^5$ are individually selected from the group consisting of hydrogen, an alkyl having from 1 to 8 carbon atoms, the group —$CH_2OX$ or their condensation products. Specific methylene donors include hexakis-(methoxymethyl)melamine, N,N',N"-trimethyl/N,N',N"-trimethylolmelamine, hexamethylolmelamine, N,N',N"-dimethylolmelamine, N-methylolmelamine, N,N'-dimethylolmelamine, N,N',N"-tris(methoxymethyl)melamine and N,N'N"-tributyl-N,N',N"-trimethylol-melamine. The N-methylol derivatives of melamine are prepared by known methods.

The weight ratio of methylene donor to the methylol modified bismaleimide may vary. Generally speaking, the weight ratio will range from about 1:10 to about 10:1. Preferably, the weight ratio ranges from about 1:3 to 3:1.

Vulcanization of the rubber compound of the present invention is generally carried out at conventional temperatures ranging from about 100° C. and 200° C. Preferably, the vulcanization is conducted at temperatures ranging from about 110° C. to 180° C. Any of the usual vulcanization processes may be used such as heating in a press or mold, heating with superheated steam or hot air or in a salt bath.

The following examples are presented in order to illustrate but not limit the present invention.

EXAMPLE 1

A three liter three neck round bottom flask was fitted with a thermocouple, heating jacket, stirrer, reflux condenser and charged with 80.4 grams (0.30 mole) of N,N'-(m-phenylene)bismaleimide, 1500 ml of distilled water, 25 grams (0.30 mole) of 37 percent formalin solution and 3.0 grams of sodium hydroxide. The fine yellow dispersion was stirred and heated to reflux to a pot temperature from about 99° to 100° C. for one-half hour. A coarse mustard colored precipitate was formed. The reaction mixture was cooled to room temperature and suction filtered to give 91.5 grams of a coarse solid product.

The methylol modified bismaleimide product had a melting point of 225° C. The starting material bismaleimide had a melting point of 195° C. The methylol modified bismaleimide had only slight solubility at room temperature in dimethylsulfoxide for NMR (proton analysis), while the starting material bismaleimide was very soluble in dimethylsulfoxide. The 300 MHz NMR spectra of the methylol modified bismaleimide (in DMSO at 100° C.) indicated partial loss of maleimide double bond protons (7.0974 ppm), loss of the aromatic proton symmetry (7.3579 to 7.5907 ppm) and the presence of a new active methylene group at 6.0587 ppm.

EXAMPLE 2

The conditions of Example 1 were repeated except the molar ratio of formaldehyde to the bismaleimide was 4:1 where 40.2 grams (0.15 mole) of the bismaleimide and 50 grams (0.6 mole) of the 37 percent aqueous formalin were allowed to react at reflux with 3.0 grams of sodium hydroxide in 1500 ml of water. A rust-orange color solid was formed. The methyl-modified bismaleimide does not have a distinct melting point, but darkens and starts to decompose above 225° C. Its solubility in dimethyl sulfoxide at room temperature is only slight, whereas it is insoluble in chloroform and tetrahydrofuran. The 300 MHz NMR spectra was obtained at 100° C. in DMSO and indicated a slightly greater loss of the maleimide double bond protons (7.0974 ppm), loss of the aromatic proton symmetry (7.3579 to 7.5907 ppm) and the presence of a new active methylene group at 6.1255 ppm with increased area.

EXAMPLE 3

Rubber stocks were prepared in order to compare the effects of using N,N'- (m-phenylene)bismaleimide versus the methylol modified bismaleimide of Example 1. Each rubber stock contained 50 phr of natural rubber, 50 phr of synthetic cis-polyisoprene, and conventional amounts of carbon black, processing oil, stearic acid, antidegradants, zinc oxide, sulfur and accelerators. The rubbers, carbon black, processing oil and stearic acid were combined in a nonproductive stage. The remaining ingredients were combined in the productive stage. In addition to the above ingredients, some of the samples contained resorcinol, N,N'-(m-phenylenebismaleimide), methylol modified bismaleimide, and hexamethoxymethylmelamine. These ingredients were added at the productive stage except the resorcinol was added at the nonproductive stage. Table I below lists the levels of those ingredients which were not common to all of the rubber stocks. Table I also lists the resulting physical properties of each sample.

mined by pulling one compound away from another at a right angle to the untorn test specimen with the two ends being pulled apart at a 180° angle to each other using an Instron machine. The area of contact was determined from placement of a Mylar sheet between the compounds during cure. A window in the Mylar allowed the two materials to come into contact with each other during testing.

Shore Hardness was determined in accordance with ASTM.1415.

TABLE I

| Sample | Control 1 | Control 2 | 3 | Control 4 | 5 | Control 6 | 7 |
|---|---|---|---|---|---|---|---|
| Methylol-modified bismaleimide | 0 | 0 | 2 | 0 | 2 | 0 | 2 |
| N,N'-(m-phenylene)-bismaleimide | 0 | 2 | 0 | 2 | 0 | 2 | 0 |
| Resorcinol | 0 | 0 | 0 | 0 | 0 | 2 | 2 |
| Hexamethoxy-methylmelamine | 0 | 0 | 0 | 3 | 3 | 0 | 0 |
| RHEOMETER (150° C.) | | | | | | | |
| Maximum (min.) | 40.5 | 49.5 | 47.0 | 54.0 | 50.5 | 41.0 | 39.0 |
| Minimum (min.) | 11.5 | 13.0 | 13.0 | 12.0 | 12.0 | 14.5 | 13.0 |
| T90 (min.) | 13.9 | 18.0 | 17.5 | 28.0 | 25.0 | 27.5 | 20.0 |
| T25 (min.) | 8.6 | 9.8 | 10.0 | 11.5 | 11.5 | 10.0 | 7.2 |
| STRESS STRAIN (15 min. @ 150° C.) | | | | | | | |
| 100% Modulus, MPa | 2.16 | 2.50 | 2.55 | 2.36 | 2.35 | 1.70 | 1.77 |
| 300% Modulus, MPa | 11.26 | 12.59 | 12.46 | 11.27 | 11.12 | 7.34 | 8.19 |
| Tensile Strength, MPa | 22.01 | 22.50 | 22.29 | 19.13 | 20.31 | 13.58 | 17.57 |
| Elongation at Break, % | 529 | 506 | 509 | 483 | 512 | 484 | 540 |
| *Cure Reversion, % | 13.6 | 3.0 | 2.6 | 0 | 0 | 2.4 | 5.1 |
| HARDNESS SHORE A | | | | | | | |
| Room Temperature | 60.4 | 65.7 | 65.0 | 65.6 | 65.5 | 65.9 | 65.3 |
| 100° C. | 56.9 | 61.4 | 61.6 | 61.7 | 60.8 | 57.8 | 57.7 |
| REBOUND (ASTM D1054) | | | | | | | |
| Room Temperature, % | 66.4 | 65.9 | 65.8 | 61.9 | 62.1 | 53.4 | 56.0 |
| 100° C., % | 50.2 | 52.0 | 51.0 | 49.9 | 49.7 | 45.5 | 45.8 |
| PEEL ADHESION | | | | | | | |
| 25 min./150° C. (N) | 205.6 | 180.6 | 203.4 | 157.3 | 195.2 | 194.3 | 236.6 |
| 40 min./150° C. (N) | 188.3 | 122.8 | 139.6 | 112.6 | 147.8 | 252.7 | 258.5 |
| 80 min./150° C. (N) | 195.1 | 90.6 | 130.3 | 79.0 | 113.3 | 223.9 | 240.5 |

*The observed percent loss or drop in maximum cure state after 120 minutes cure time.

Cure properties were determined using a Monsanto oscillating disc rheometer which was operated at a temperature of 150° C. and at a frequency of 11 hertz. A description of oscillating disc rheometers can be found in the Vanderbilt Rubber Handbook edited by Robert O. Ohm (Norwalk, Conn., R. T. Vanderbilt Company, Inc., 1990), pages 554–557. The use of this cure meter and standardized values read from the curve are specified in ASTM D-2084. A typical cure curve obtained on an oscillating disc rheometer is shown on page 555 of the 1990 edition of the Vanderbilt Rubber Handbook.

In such an oscillating disc rheometer, compounded rubber samples are subjected to an oscillating shearing action of constant amplitude. The torque of the oscillating disc embedded in the stock that is being tested that is required to oscillate the rotor at the vulcanization temperature is measured. The values obtained using this cure test are very significant since changes in the rubber or the compounding recipe are very readily detected. It is obvious that it is normally advantageous to have a fast cure rate.

The following Table I reports cure properties that were determined from cure curves that were obtained for the rubber stocks that were prepared. These properties include a torque minimum (Min Torque), a torque maximum (Max Torque), minutes to 25% of the torque increase (t25 min.), and minutes to 90% of the torque increase (t90 min.).

Peel adhesion testing was done to determine the interfacial adhesion between various rubber formulations that were prepared. The interfacial adhesion was deter- Table I demonstrates compounds containing bismaleimides can provide improved cure reversion versus a similar compound in which the bismaleimide is not present. Thus, comparing Control 1 in which no bismaleimide is present with Control 2 containing 2.0 phr N,N'-(m-phenylene)-bismaleimide or comparing with Example 3 containing 2.0 phr of methylol-modified bismaleimide, cure reversion is reduced from 13.6% measured after 120 minutes cure time for Control 1 to 3.0% for Control 2 containing N,N'-(m-phenylene)bismaleimide or reduced to 2.6% for comparative Example 3 containing methylol-modified bismaleimide. Unexpectedly, however, comparative Example 3 showed that significant improve in tear resistance can be obtained with methylol-modified bismaleimide versus the unmodified N,N'-(m-phenylene)-bismaleimide version while maintaining its improved cure reversion advantage. Thus, while Control 2 shows N,N'-(m-phenylene)-bismaleimide gives a tear strength value of 180.6N when added to Control 1, the use of the methylol-modified bismaleimide as illustrated in comparative Example 3 increased the tear value to 203.4N when added to Control 1. This represents an improvement in tear strength of 12.6%.

Comparative Example 5 likewise shows that rubber compositions containing a methylene donor such as hexamethoxymethylmelamine can benefit from the methylol-modified bismaleimide. Again, both the methylol-modified bismaleimide and the unmodified N,N'-

(m-phenylene)bismaleimide provide excellent reversion resistance protection showing no reversion after 120 minutes cure time (comparative Example 5 and Control 4, respectively) versus Control 1 containing no bismaleimide and reverting 13.6% after 120 minutes. It is seen that for rubber compositions containing a methylene donor such as hexamethoxymethylmelamine, a tear strength of 157.3N is obtained for Control 4 containing unmodified N,N'-(m-phenylene)-bismaleimide and is improved 24.1% to 195.2N when the methylol-modified bismaleimide of comparative Example 5 is used in place of N,N'-(m-phenylene)-bismaleimide of Example 4.

As a further illustration to demonstrate the tear enhancing properties of methylol-modified bismaleimide, the rubber composition of Control 6 containing resorcinol and the unmodified N,N'-(m-phenylene)-bismaleimide gave a tear value of 194.3N while the use of methylol-modified bismaleimide as in comparative Example 7 gave a tear value of 236.6N which represents a 21.8% improvement in tear.

The bismaleimide (N,N'-(1,3-phenylene)bismaleimide) and the methylol modified bismaleimide show similar cured rubber properties, such as rheometer cure rate and state of cure. They also show similar rebound and hardness suggesting similar states of cure and reinforcement. The peel adhesion, and possible improved tear properties in tires, however, are improved over the bismaleimide with the methylol modified bismaleimide.

What is claimed is:

1. A composition comprising (a) a sulfur vulcanizable rubber; (b) a sulfur vulcanizing agent; and (c) 0.25 to 5.0 phr of a methylol modified bismaleimide which is prepared by reacting under condensation conditions:
   (1) an aldehyde selected from the group consisting of formaldehyde, acetaldehyde or mixtures thereof; with
   (2) a bismaleimide of the formula:

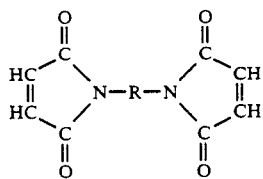

wherein R is a divalent radical selected from the group consisting of an acyclic aliphatic group, a cyclic aliphatic group, an aromatic group, and one to three alkylaromatic groups and wherein these groups may contain a hetero atom selected from O, N and S.

2. The composition of claim 1 wherein the mole ratio of aldehyde to bismaleimide is 0.5:10 to 10:0.5.

3. The composition of claim 17 wherein said bismaleimide is selected from the group consisting of N,N'-ethylenebismaleimide, N,N'-hexamethylenebismaleimide, N,N'-dodecamethylenebismaleimide, N,N'-(2,2,4-trimethylhexamethylene)bismaleimide, N,N'-(oxydipropylene)bismaleimide, N,N'-(aminodipropylene)bismaleimide, N,N'-(ethylenedioxydipropylene)bismaleimide, N,N'-(1,4-cyclohexylene)bismaleimide, N,N'-(1,3-cyclohexylene)bismaleimide, N,N'-(methylene-1,4-dicyclohexylene)bismaleimide, N,N'-(isopropylidene-1,4-dicyclohexylene)bismaleimide, N,N'-(oxy-1,4-dicyclohexylene) bismaleimide, N,N'-(m-phenylene)bismaleimide, N,N'-(p-phenylene)bismaleimide, N,N'-(o-phenylene)bismaleimide, N,N'-(1,3-naphthylene) bismaleimide, N,N'-(1,4-naphthylene)bismaleimide, N,N'-(1,5-naphthylene) bismaleimide, N,N'-(3,3'-dimethyl-4,4'-biphenylene)bismaleimide, N,N'-(3,3'-dichloro-4,4'-biphenylene) bismaleimide, N,N'-(2,4-pyridyl)bismaleimide, N,N'-(2,6-yridyl)bismaleimide, N,N'-(4-methyl-2,6-pyridyl)bismaleimide, N,N'-(1,4-anthraquinonediyl) bismaleimide, N,N'-(m-tolylene)bismaleimide, N,N'-(p-tolylene)bismaleimide, N,N'-(4,6-dimethyl-1,3-phenylene)bismaleimide, N,N'-(2,3-dimethyl-1,4-phenylene)bismaleimide, N,N'-(4,6-dichloro-1,3-phenylene)bismaleimide, N,N'-(5-chloro-1,3-phenylene)bismaleimide, N,N'-(5-hydroxy-1,3-phenylene) bismaleimide, N,N'-(5-methoxy-1,3-phenylene)-bismaleimide, N,N'-(m-xylylene) bismaleimide, N,N'-(p-xylylene)bismaleimide, N,N'-(methylenddi-p-phenylene) bismaleimide, N,N'-(isopropylidenedi-p-phenylene)bismaleimide, N,N'-(oxydip-phenylene) bismaleimide, N,N'-(thiodi-p-phenylene)bismaleimide, N,N'-(dithiodi-p-phenylene) bismaleimide, N,N'-(sulfodi-p-phenylene)bismaleimide, N,N'-(carbonyldi-p-phenylene) bismaleimide, and N,N'-[α,α'-bis(p-maleimidophenyl)-p-diisopropylbenzene].

4. The composition of claim 1 wherein the aldehyde and bismaleimide are reacted in an aqueous solvent.

5. The composition of claim 1 wherein the aldehyde and bismaleimide are reacted at a temperature of from 100° to 125° C.

6. The composition of claim 1 wherein the sulfur vulcanizing agent is selected from the group consisting of elemental sulfur, an amine disulfide, polymeric polysulfide or sulfur olefin adduct.

7. The composition of claim 1 wherein said rubber is selected from the group consisting of natural rubber, polybutadiene, butyl rubber, EPDM, butadiene-styrene copolymer, butadiene-styrene-isoprene copolymer and 1,4-cis-polyisoprene.

8. The composition of claim 1 wherein a methylene donor is added to said rubber.

9. The composition of claim 8 wherein the methylene donor is selected from the group consisting of hexamethylene tetramine, hexamethoxymethyl melamine, lauryloxymethyl pyridinium chloride, ethyloxymethyl pyridinium chloride, trioxan hexamethylolmelamine and paraformaldehyde.

10. The composition according to claim 8 wherein the methylene donor is selected from the general formula:

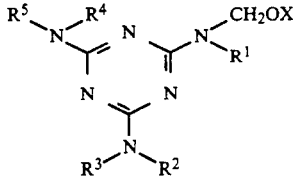

wherein X is an alkyl having from 1 to 8 carbon atoms, $R^1$, $R^2$, $R^3$, $R^4$ and $R^5$ are individually selected from the group consisting of hydrogen, an alkyl having from 1 to 8 carbon atoms, the group —CH$_2$OX or their condensation products.

11. The composition of claim 8 wherein the methylene donor is selected from the group consisting of hexakis(methoxymethyl)melamine, N,N',N"-trimethyl/N,N',N"-trimethylolmelamine, hexamethylolmelamine, N,N',N"-dimethylolmelamine, N-methylolmelamine, N,N'-dimethylolmelamine, N,N',N"tris(methoxymethyl)melamine and N,N',N"tributyl-N,N',N"-trimethylol melamine.

12. The composition of claim 8 wherein the weight ratio of methylene donor to the methylol modified bismaleimide may range from about 1:10 to about 10:1.

13. The composition of claim 12 wherein the weight ratio of methylene donor to the methylol modified bismaleimide may range from about 1:3 to about 3:1.

14. The composition of claim 6 wherein the sulfur vulcanizing agent ranges from about 0.1 to about 5 phr.

* * * * *